(12) United States Patent
Alicherry et al.

(10) Patent No.: US 7,725,510 B2
(45) Date of Patent: May 25, 2010

(54) METHOD AND SYSTEM FOR MULTI-CHARACTER MULTI-PATTERN PATTERN MATCHING

(75) Inventors: Mansoor Ali Khan Alicherry, Scotch Plains, NJ (US); Muthuprasanna Muthusrinivasan, Ames, IA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 531 days.

(21) Appl. No.: 11/497,065

(22) Filed: Aug. 1, 2006

(65) Prior Publication Data

US 2008/0046423 A1 Feb. 21, 2008

(51) Int. Cl.
*G06F 17/30* (2006.01)

(52) U.S. Cl. .............. 707/999.006; 707/999.1; 707/999.2; 370/419

(58) Field of Classification Search ......... 707/999.001, 707/999.003, 999.006, 999.1, 999.2; 709/224, 709/227; 365/49.1; 370/230, 395.32, 419
See application file for complete search history.

(56) References Cited

U.S. PATENT DOCUMENTS

| | | | | |
|---|---|---|---|---|
| 5,995,963 | A * | 11/1999 | Nanba et al. | 707/6 |
| 6,892,237 | B1 | 5/2005 | Gai et al. | |
| 7,002,965 | B1 * | 2/2006 | Cheriton | 370/395.32 |
| 7,185,081 | B1 * | 2/2007 | Liao | 709/224 |
| 7,225,188 | B1 * | 5/2007 | Gai et al. | 707/6 |
| 2003/0051043 | A1 * | 3/2003 | Wyschogrod et al. | 709/230 |
| 2005/0114700 | A1 | 5/2005 | Barrie et al. | |
| 2005/0132342 | A1 | 6/2005 | Van Lunteren | |
| 2006/0020595 | A1 | 1/2006 | Norton et al. | |
| 2006/0221658 | A1 * | 10/2006 | Gould et al. | 365/49 |
| 2007/0130140 | A1 * | 6/2007 | Cytron et al. | 707/6 |

OTHER PUBLICATIONS

J. Fan, et al., "An Efficient Algorithm for Matching Multiple Patterns," IEEE Trans on Knowledge and Data Engineering, vol. 5, No. 2, 1993, pp. 339-351.
A. Aho, et al., "Efficient String Matching: An Aid to Bibliographic Search", Communications of the ACM, vol. 18, No. 6, 1975, pp. 333-340.
F. Yu, et al., "Gigabit Rate Packet Pattern-Matching Using TCAM", in IEEE ICNP, 2004, pp. 174-183.

(Continued)

*Primary Examiner*—Fred I Ehichioya
(74) *Attorney, Agent, or Firm*—Harness, Dickey & Pierce

(57) ABSTRACT

Disclosed is a method and system for multi-character multi-pattern pattern matching. In the multi-character multi-pattern pattern matching method, patterns in an input stream are detected by transitioning between states of a "compressed deterministic finite state automaton (DFA)", with each transition based on multiple characters of the input stream. The compressed DFA is created by compressing an original DFA, such as an Aho-Corasick DFA, such that each state of the compressed DFA represents multiple consecutive states of the original DFA and each transition between the states of the compressed DFA is a combination of all of the transitions between the multiple consecutive states of the original DFA. This method can be implemented using a Ternary Content-Addressable Memory (TCAM) to store the transitions of the compressed DFA and compares the transitions with multiple characters of an input stream at a time to detect patterns in the input stream.

20 Claims, 11 Drawing Sheets

OTHER PUBLICATIONS

R. Karp, et al., "Efficient Randomized Pattern-Matching Algorithms", IBM J. Res. Dev., vol. 31, No. 2, 1987, pp. 249-260.

Y. Sugawara, et al., Over 10Gbps String Matching Mechanism for Multi-Stream Packet-Scanning Systems, in FPL 2004, pp. 484-493.

G. Tripp, "A Finite-State-Machine Based String Matching System for Intrusion Detection on High-Speed Networks", in EICAR 2005, pp. 26-40.

M. Aldwairi, et al., "Configurable String Matching Hardware for Speeding Up Intrusion Detection", SIGARCH. Comput. Archit. News, vol. 33, No. 1, 2005, pp. 99-107.

N. Tuck, et al., "Deterministic Memory-Efficient String Matching Algorithms for Intrusion Detection", IEEE Infocom 2004, pp. 333-340.

D. Moore, et al., Internet Quarantine: Requirements for Containing Self-Propagating Code, in IEEE INFOCOM, 2003.

* cited by examiner

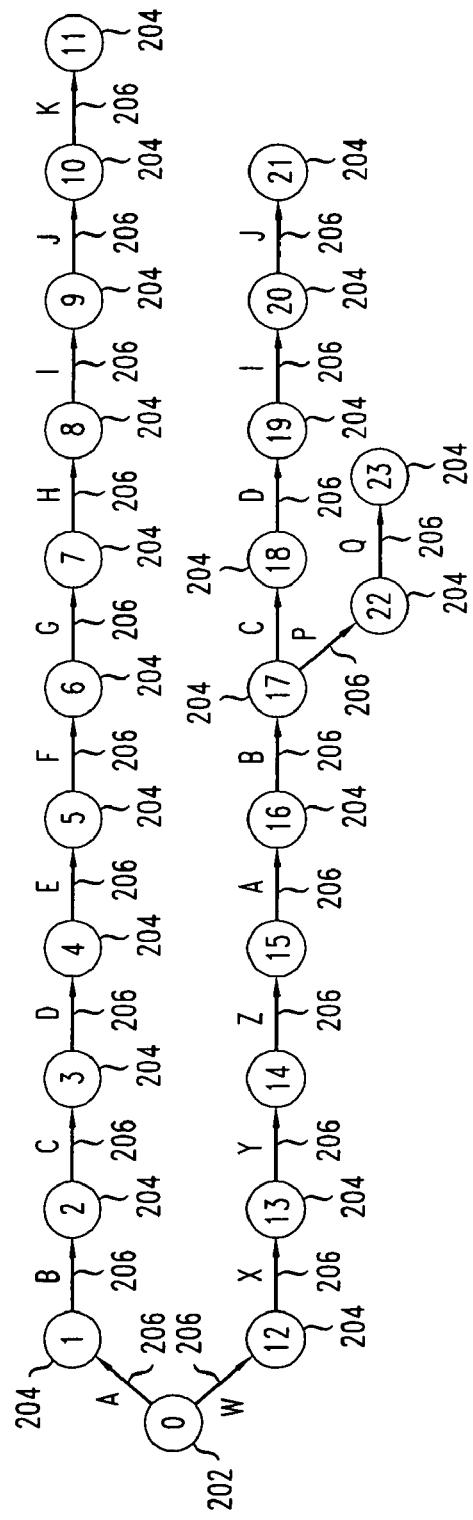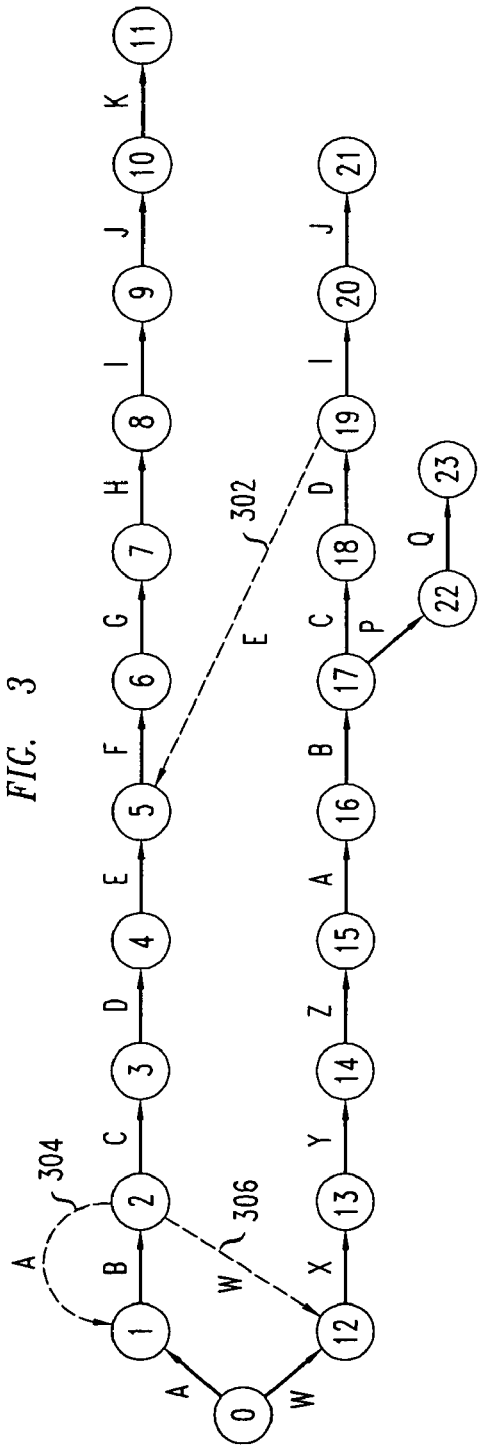
FIG. 2
FIG. 3

FIG. 4 cGoto(st$_0$, parc, depth, inp, out)
{

410 {
    if (st$_0$ is a core state)
    {
        St$_0$ = Create a new compressed state
        Goto$_c$ (parc, inp) = st$_c$
        parent (st$_c$) = parc
        parc = st$_c$
        skick(st$_0$) = st$_c$
        output$_c$(parc, st$_c$, inp) = out
        if (st$_0$ is not an end core state or is a leaf state)
            inp = out = null
    }

420 {
    cParent(st$_0$) = parc
    for all a such that goto$_0$(st$_0$, a) ≠ null
    {
        Out=out ∪ output,(goto$_0$ (st$_0$, a))
        cGoto(gto (st$_0$, a), parc, depth + 1, inp + a, out)
        if(st$_0$ is not a core state)
            skick(st$_0$) = skick(st$_0$) ∪ skick(goto (st$_0$, a))
    }

}

FIG. 6 nextStateSafe($state_0$, depth)
{
    610 $\begin{cases} \text{Safe}(state_0) = \text{true} \\ \text{if } (\exists\ a\ \text{such that depth(next}(state_0,a)) > m) \\ \quad \text{safe}(state_0) = \text{false} \\ \text{for all } a \text{ such that } goto_0(state_0,\ a) \neq \text{null} \end{cases}$
    {
    620 $\begin{cases} \text{nextStateSafe}(goto_0(state_0,\ a),\ \text{depth} + 1) \\ \text{if } (\text{state}(goto_0(state_0,\ a)) == \text{false}) \\ \quad \text{safe}(state_0) = \text{false} \end{cases}$
    }
    if($state_0$ is a core state)
    630     safe($state_0$) = true
}

FIG. 7

```
dfsCompressedNext(st_o)
{
        parc = cParent(st_o)
        for all (a such that depth(next_o(st_o, a)) > m)
        {
                nxt = next_o(st_o, a)
                pNxt_c = cParent(nxt)
                backneed = 0
                for all sNxt_c ∈ skick(nxt)
                        backneed = cFwd(st_o, parc, nxt, sNxt_c)
                if (backneed == 1)
                        cBwd(st_o, parc, nxt, pNxt_c)
        }
        For all a such that goto_o(st_o, a) ≠ null
                dfs CompressedNext(goto_o(st_o, a))
}
/* Forward next transition */
cFwd(st_o, parc, nxt, sNxt_c)
{
        len = dist(st_o, parc) + 1 + dist(nxt, sNxt_c)
        inp = (string(st_o) - string(parc)) + a
        inp = inp + string (sNxt_c) - string(nxt))
        if (len < TW and safe(nxt) == true)
        {
                Next_c(parc, inp, len = sNx
                out = cout(parc, st_o) ∪ output_o(nxt)
                out = out ∪ cout(nxt, sNxtc)
                output_c(parc, sNxt_c, inp) = out
        }else
                backneed = 1
        return backneed
}
/* Backward next transition */
cBwd(st_o, parc, nxt, pNxt_c)
{
        len = dist(st_o, parc) + 1 - dist(pNxt_c, nxt)
        inp = (string(st_o) - string(parc)) + a
        next_c(parc, inp, len) = pNxt_c
        if (len > 0)
        {
                out = cout(parc, st_o, len)
                if (len == depth(parc) - depth(parc) - depth(st_o) +1)
                        out = out ∪ output_o(nxt)
        }else
                out = null
        output_c(parc, pNxt_c, inp) = out
}
```

710 — first block
720 — cFwd block
730 — cBwd block

FIG. 10 for all input string s such that $goto_c(root, s) \neq null$
{
    at = $goto_c(root, s)$
    for i = 1 to strlen(s)
    {
        $s_{init}$ = $?^{TW-i}$ + substr(s, 0, i)
        $s_{final}$ = substr(s, i, TW-i)
        if ($goto_c(root, s_{init})$ == null 1010
        {
            $st_c$ = Create a new compressed state
            $goto_c(root, s_{init})$ = $st_c$
            The no. of characters consumed is TW
            while ($s_{init} \neq null$)
            {
                if ($s_{init}$ == pattern)
                out = out $\cup$ $s_{init}$
                $s_{init}$ = substr($s_{init}$, 1, length($s_{init}$) − 1)
            }
            $output_c(root, st_c, s_{init})$ = out
        }

1020
        $goto_c(st_c, s_{final})$ = st
        The no. of characters consumed is length ($s_{final}$)
        $output_c(st_c, st, s_{final})$ = output (root, st, s) − out
    }
}

METHOD AND SYSTEM FOR MULTI-CHARACTER MULTI-PATTERN PATTERN MATCHING

BACKGROUND OF THE INVENTION

The present invention is generally directed to pattern matching. More specifically, the present invention is directed to a method and system for multi-character multi-pattern pattern matching.

Pattern matching is used to detect the occurrence of a pattern or keyword in a search target. For example, given two strings, a simple pattern matching algorithm can detect the occurrence of one of the strings in the other. Pattern matching algorithms are widely used in information retrieval applications, such as data mining, bibliographic searching, search and replace text editing, word processing, etc., and content inspection applications, such as Network Intrusion Detection Systems (NIDS), virus/worm detection using signature matching, IP address lookup in network routers, DNA sequence matching, etc.

For many applications, it is necessary to detect multiple patterns in a particular search target. A conventional multi-pattern pattern matching algorithm is the Aho-Corasick (AC) algorithm. The AC algorithm locates all occurrences of any of a finite number of keywords in a string by constructing a finite state pattern matching machine to process the string in a single pass. For example, this algorithm can be used to detect virus/worm signatures in a data packet stream by running the data packet stream through the finite state machine byte by byte.

The AC algorithm constructs the finite state machine in three pre-processing stages, namely the goto stage, the failure stage, and the next stage. In the goto stage, a deterministic finite state automaton (DFA) or keyword trie is constructed for a given pattern set. The DFA constructed in the goto stage includes various states for an input string, and transitions between the states based on characters of the input string. Each transition between states in the DFA is based on a single character of the input string. The failure and next stages add additional transitions between the states of the DFA to ensure that a string of length n can be searched in exactly n cycles. Essentially, these additional transitions help the algorithm to slide from the currently matched pattern (not a match anymore) to another pattern which is the next best (longest prefix) match in the DFA. Once the pre-processing has been performed, the DFA can then be used to search any target for all of the patterns in the pattern set.

During the search stage, the AC DFA processes one character (or byte) per transition in the DFA, and each transition is stored in a memory. Accordingly, the AC DFA transitions to a different state based on each character of the input string. Hence, for each character in an input string, a memory lookup operation must be performed to access the transitions from the current state of the AC DFA and compare the transitions to the character.

Virus/worm detection applications must detect the presence of multiple virus/worm signatures in a stream of packets in a single pass as the packets are transmitted in a data network. As network speeds have increased, conventional pattern matching algorithms, such as the AC algorithm, cannot perform at high enough speeds to keep up the network speeds. One reason that conventional pattern matching algorithms cannot perform at high speeds is because a memory lookup operation must be performed for each byte of the stream of packets.

What is needed is a multi-pattern matching method that can be used for high speed applications.

BRIEF SUMMARY OF THE INVENTION

The present invention provides a method for multi-pattern pattern matching that processes multiple characters of an input stream for each transition between states. This method provides higher pattern matching speeds and can be used with high speed applications. The present invention also provides a system capable of optimal implementation of the multi-character multi-pattern matching method.

According to an embodiment of the present invention, all occurrences of multiple patterns in an input stream are detected by transitioning between multiple states of a compressed deterministic finite state automaton (DFA), each transition based on multiple characters of the input stream. The compressed DFA can be generated by constructing an original DFA, such as an Aho-Corasick DFA, and compressing the original DFA such that each state of the compressed DFA represents multiple consecutive states of the original DFA. The transitions between the states of the compressed DFA are combinations of all of the transitions between the consecutive multiple states of the original DFA.

In an embodiment of the present invention, regular expressions, made up of multiple sub patterns and wildcards, are split up into the multiple sub patterns, and each sub pattern is separately included in the compressed DFA. When patterns are detected in an input stream, the regular expression can be identified based on the sub patterns being detected at specified offsets corresponding to the regular expression.

According to an embodiment of the present invention, a system for implementing a multi-character multi-pattern pattern matching method includes a Ternary Content-Addressable Memory (TCAM) and a Static Random Access Memory (SRAM). The TCAM stores entries, each entry including a state of a compressed DFA and a multiple character transition from that state. The SRAM stores a next state of the compressed DFA, input length value, and a detected patterns list corresponding to each entry of the TCAM. The TCAM compares an input stream, multiple characters at a time, to the entries of the TCAM. If a matching entry is found in the TCAM, an address to a location in the SRAM of the corresponding next state, input value length, and detected patterns list is returned. By repeating this procedure, the TCAM compares all of the characters of the input stream to the entries of the TCAM and detects all of the patterns in the input stream by transitioning based on multiple characters.

These and other advantages of the invention will be apparent to those of ordinary skill in the art by reference to the following detailed description and the accompanying drawings.

BRIEF DESCRIPTION OF THE DRAWINGS

FIG. 2 illustrates an exemplary goto graph for an Aho-Corasick (AC) deterministic finite state automaton (DFA);

FIG. 3 illustrates exemplary next transitions on the goto graph of FIG. 2 for an AC DFA;

FIG. 4 is pseudo code of a goto algorithm of a compressed DFA;

FIG. 6 is pseudo code of an algorithm for safe state computation;

FIG. 7 is pseudo code of an algorithm for computing next transitions for a compressed DFA;

FIG. 10 is pseudo code of an algorithm for generating shallow states in a compressed DFA;

DETAILED DESCRIPTION OF THE INVENTION

Figure 1:
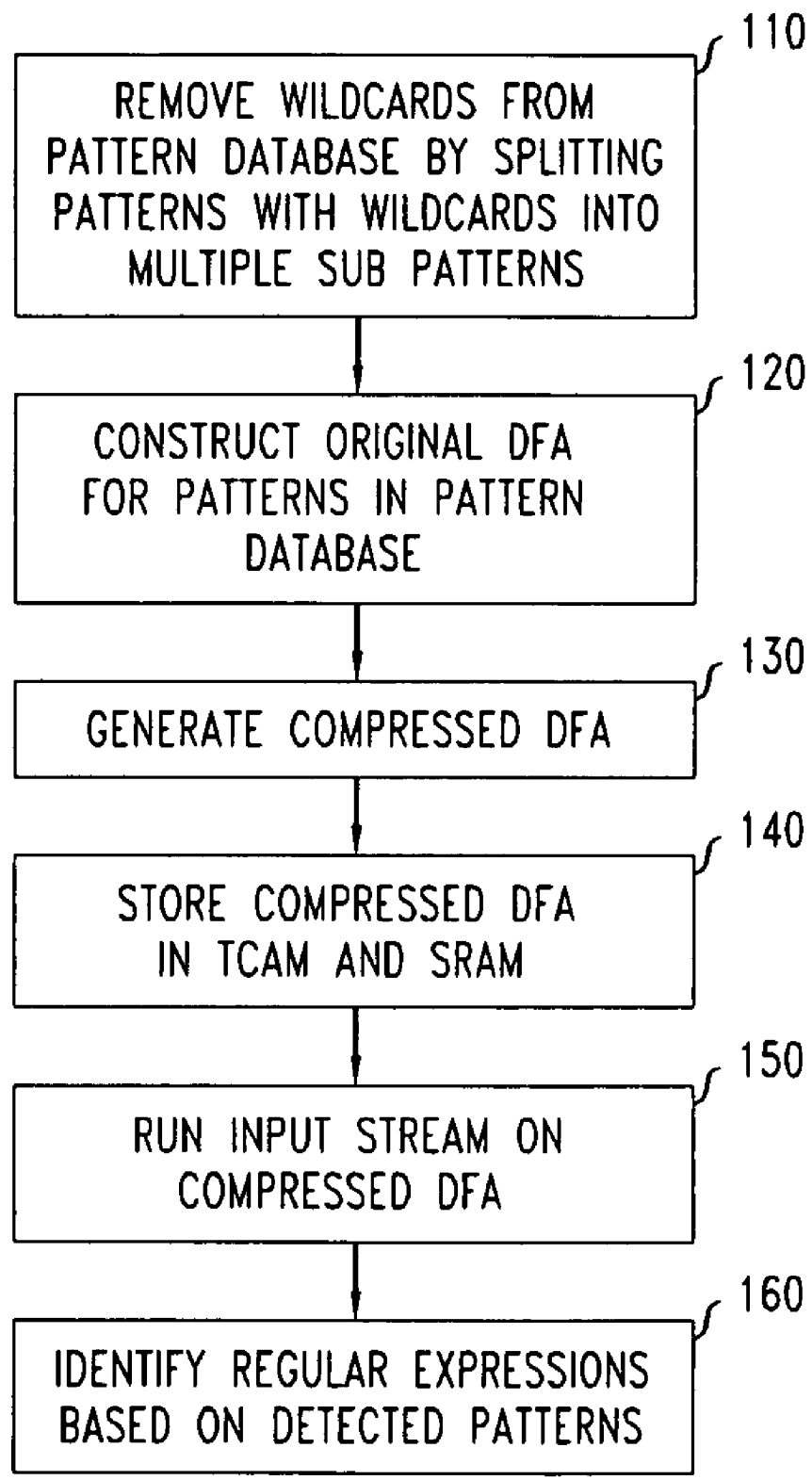
FIG. 1 illustrates a method for multi-character multi-pattern pattern matching according to an embodiment of the present invention.

FIG. 1 illustrates a method for multi-character multi-pattern pattern matching according to an embodiment of the present invention. This method is used to detect a finite number of keywords (patterns) in an input stream. Thus, given a pattern database storing multiple patterns, this method detects all occurrences of each pattern in an input stream. The input stream can be, for example, a string of text or a stream of data packets, but the present invention is not limited thereto. The input stream can be any bit-stream, and the patterns can be any bit-stream as well. The input stream is made up of characters. As used herein, the term character refers to any basic unit of the input stream. The pattern matching is performed on the basis of the characters of the input stream. The characters of the input stream are not limited to ASCII characters, as the algorithm works for any data representation. For example, the term character may refer to letters of a text string and bytes of a data packet stream. A character may also refer to a bit in a binary bit stream. Accordingly, what "character" is being used as a basis for the pattern matching depends on a granularity of the pattern matching.

The method of FIG. 1 generates an original deterministic finite state automaton (DFA) and a compressed DFA. Listed below are functions that are used throughout this method. Since the same function names are used for the original DFA and the compressed DFA, the subscripts o and c are used to distinguish the original DFA and the compressed DFA, respectively.

$goto_o(s_o,a)$ The goto function of the original DFA. The DFA in state $s_o$ reaches the state $goto_o(s_o,a)$ on the input character $\alpha$.

$fail_o(s_o)$ The failure function of the original DFA. The DFA in state $s_o$ is equivalent to the state $fail(s_o)$, as the string representing $fail(s_o)$ is a suffix of the string representing $s_o$.

$next_o(s_o,\alpha)$ The next function of the original DFA. The DFA in state $s_o$ reaches the state $next_o(s_o,\alpha)$ on the input character $\alpha$.

$output_o(s_o)$ The output function of the original DFA. The DFA in state $s_o$ indicates that $output_o(s_o)$ patterns have been matched.

$goto_c(s_c,inp)$ The goto function of the compressed DFA. The DFA in state $s_c$ reaches the state $goto_c(s_c,inp)$ on input string inp and consumes all the characters in the input.

$next_c(s_c, inp, len)$ The next function of the compressed DFA. The DFA in state $s_c$ reaches the state $next_c(s_c, inp, len)$ on the input string inp and consumes len characters, len can be less than the length of the string inp. In those cases remaining characters in the string serve as a look-ahead. In some cases len can be negative; Here, the input pointer is moved back by the amount |len|.

$output_c(s_1, s_2, inp)$ The output function of the compressed DFA. The DFA in state $s_1$, when it reaches the state $s_2$, on the input string inp, indicates that $output_c(s_1, s_2, inp)$ patterns have been matched.

root is the start state (start 0) in the DFA. The root of both the original DFA and the compressed DFA is denoted by the same notation.

parent(s) is the parent state of s in the goto graph.

depth(s) is the depth of state s in the DFA.

string(s) is the minimum input string that will take the DFA from the root to the state s. The operators + on strings are used to denote the concatenation. The operator – is used for the string difference. String difference is defined for two strings $str_1$ an+ d $str_2$, if one is a prefix of the other.

$dist(s_1,s_2)$ is defined as the length of $string(s_2)-string(s_1)$, where $string(s_1)$ is a prefix of $string(s_2)$.

core state is that state that is at a depth, that is a multiple of K (where K is the maximum number of characters consumed in a single transition in the compressed DFA) in the original DFA or that state where a pattern starting at the root terminates in the original DFA.

$skick(s_o)$ The sidekick of state $s_o$ in the original DFA is the corresponding state in the compressed DFA, if it is a core state. If $s_o$ is a non-core state, it points to the sidekick states of all the states in the original DFA that can be reached in less than K goto transitions, chosen uniquely.

$output(s_1, s_2, n)$ is defined as the union of the output function of the first n states reached when traversing from $s_1$ to $s_2$ in the original DFA, including $s_2$ but excluding $s_1$. If n is undefined, it takes the maximum permissible value (depth $(s_2)$-depth$(s_1)$). If $s_1$ or $s_2$ represent states in the compressed DFA, the corresponding core states in the original DFA that have a sidekick to these states are considered.

$cParent(s_o)$ The compressed parent of a state $s_o$ in the original DFA is defined as the sidekick state if $s_o$ is a core state or the parent of the sidekick state if it is a non-core state.

Referring to FIG. 1, at step 110, wildcards are removed from the pattern database by splitting patterns with wildcards into multiple sub patterns. A pattern with wildcards is referred to herein as a regular expression. Any regular expression S can be decomposed into sub patterns. For example, S can be given by s1???s2*s3, where s1, s2, and s3 are each simple patterns, and broken into the sub patterns of s1, s2, and s3. The sub patterns can be implemented in the pattern database as three different patterns.

At step 120, an original deterministic finite state automaton (DFA) is constructed for the patterns in the pattern database. According to an embodiment of the present invention, the original DFA can be constructed using the Aho-Corasick (AC) algorithm. The AC algorithm is described in greater detail in A. V. Aho and M. J. Corasick, "Efficient string matching: an aid to bibliographic search," Comm. ACM, vol. 18, no. 6, pp. 333-340, June 1975. The AC DFA is constructed by constructing a trie of the patterns using a goto function, computing a failure function, and constructing an additional set of transitions using a next function. The goto function is used to construct an initial finite state machine called a goto graph. A goto graph is made up of vertices representing states and edges connecting the vertices representing transitions between the states. FIG. 2A illustrates an exemplary goto graph for an AC DFA. The goto graph is constructed starting with one vertex 202, called the root state 202, which represents state 0. Each pattern is then entered into the graph by adding to the graph a directed path that begins at the root state 202. New vertices 204 and edges 206, representing states and transitions, respectively, are added to the graph so that there will be, starting at the root state 202, a path in the graph that spells out each pattern. FIG. 2 shows an exemplary goto graph for three patterns, ABCDEFGHIJK, WXYZABCDIJ, and WXYZAB. As illustrated in FIG. 2, each transition in the goto graph is based on one character.

The patterns entered into the original DFA in the goto stage could possibly satisfy a property that a sub-sequence that is a prefix of one pattern is a suffix of another pattern. Thus, when traversing the part of the original DFA that represents the sub-sequence in the pattern where it is a suffix, a possible match could be indicated for both patterns. Hence, the failure function is defined for the original DFA to shift from one pattern to another pattern at the sub-sequence boundary when no more of the longer pattern is being matched. The next function for the original DFA improves upon the failure function to guarantee a single character consumption for every transition, at the cost of a larger DFA. The next function adds next transitions to the goto graph. FIG. 3 illustrates an exemplary DFA corresponding to the goto graph of FIG. 2 including next transitions. As illustrated in FIG. 3, the sub-sequence ABCD occurs in the pattern WXYZABCDIJ and the pattern ABCDEFGHIJK. Thus, if the sub-sequence ABCD occurs directly after WXYZ, the input stream would be at state 19. However, because the sub-sequence can be part of the pattern ABCDEFGHIJK as well as WXYZABCDIJ, a next transition 302 is added between state 19 and state 5 based on the character E. Thus, at state 19, if the character E is detected, the DFA transitions to state 5. Furthermore, a pattern can begin at any state. For example, if the character A or W is detected at state 2, that character could be the beginning of the pattern ABCDEFGHIJK or WXYZABCDIJ, respectively. Accordingly, next transitions 304 and 306 are added between state 2 and states 1 and 12, respectively. Although not illustrated in FIG. 3, similar next transitions can be added for all of the other states (except state 15 which has a next transition only to state 12).

Returning to FIG. 1, at step 130, a compressed DFA is generated based on the original DFA. Each state of the compressed DFA represents up to K consecutive states of the original DFA. Each transition of the compressed DFA is based on multiple characters. For each state in the original DFA which has a depth that is a multiple of K, a corresponding compressed DFA state is constructed. A compressed DFA state is also constructed for each state in the original DFA where a pattern that starts at the root terminates. The states of the original DFA for which there is a corresponding state in the compressed DFA are called core states. The subset of core states which correspond to pattern terminating states are specifically called end core states. Two core states are considered to be adjacent if the directed path length between them is at most K. The goto function of the compressed DFA is derived from the consecutive goto transitions between adjacent core states of the original DFA. The next function of the compressed DFA is derived from the next transitions of the original DFA.

A many-to-many mapping (called a sidekick) from the original DFA to the compressed DFA is created. Every core state of the original DFA uniquely maps to its corresponding compressed state. All of the non-core states in the path between two adjacent core states $s1_o$ and $s2_0$ (depth($s1_o$) <depth($s2_o$)) maps to the sidekick of $s2_o$. There may be multiple elements in the sidekick of a non-core state, if that state is part of multiple patterns. The sidekick of any original DFA state $s_o$ is thus the closest compressed DFA state $s_c$, such that $0<=\text{dist}(s_o, s_c)<K$.

A function cParent is defined for the states of the original DFA as follows: If the state is a core state, then cParent of the state is its sidekick state; if the state is a non-core state, then cParent is the parent of any of its sidekicks. Note that the parents of all sidekick states of a non-core state are the same. Thus, if the transitions are only goto transitions, the compressed DFA would be on the state cParent($state_o$), if the original DFA reaches $state_o$. The cParent of any original DFA state $s_o$ is thus the closest compressed DFA state $s_c$, such that $0<=\text{dist}(s_c, s_o)<K$.

FIG. 4 is pseudo code for the goto algorithm of the compressed DFA. This algorithm generates a compress goto graph by doing a depth first search on the original goto graph. A depth first search starts from the root of the goto graph and searches all the nodes that are one-hop away first, then all the nodes that are two-hops away, and so on until all the nodes in the goto graph have been covered. During the depth first search, the algorithm keeps track of the compressed state corresponding to the preceding core state ($parent_c$), and the part of the pattern starting from that state (input). In the pseudo code identified by 410, if the current state is a core state (i.e., the depth is a multiple of K or a pattern-end state), the algorithm creates a new compressed state. A goto transition on the string input is created from the parent to the new state. The new state becomes the new parent and the input is reset to null. The sidekick and the cParent of the core state will become the new state. In the pseudo code identified by 420, if a state is not a core state, sidekick information is populated from its child states. This algorithm is recursively called for all children in the original goto graph, with the transition character from each state appended to the input string. Similarly, even information regarding the output function is also appropriately updated at each state. This algorithm generates a compressed goto graph which is an accurate representation of the original goto graph.

Figure 5:
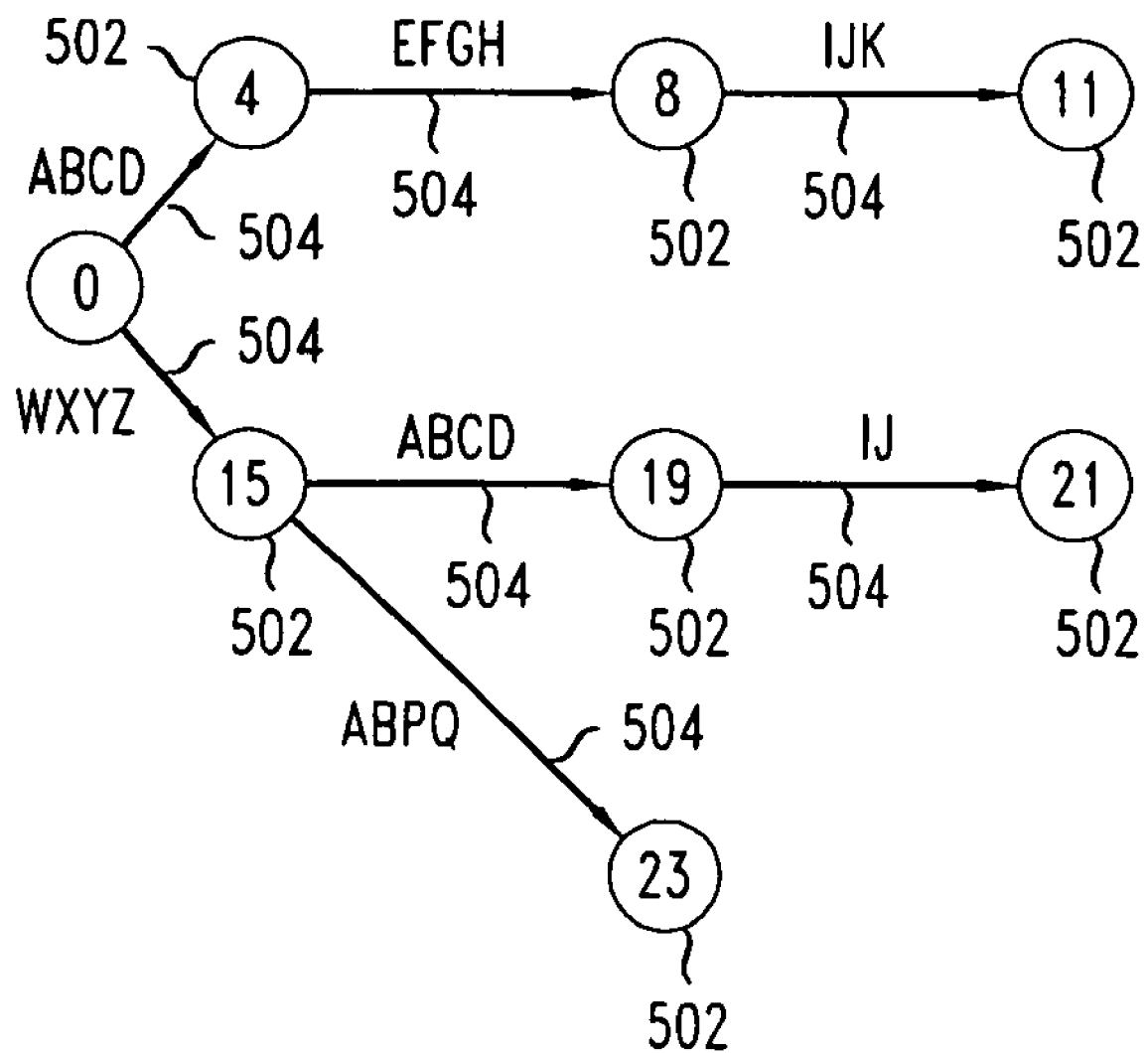
FIG. 5 illustrates an exemplary goto graph of a compressed DFA.

FIG. 5 illustrates an exemplary goto graph of a compressed DFA. The compressed goto graph of FIG. 5 corresponds to the original goto graph of FIG. 2 for K=4. Similar to the goto graph of FIG. 2, the patterns of the compressed goto graph are ABCDEFGHIJK, WXYZABCDIJ, and WXYZABPQ. Since K=4, the core states of the original DFA are states 0, 4, 8, 11, 15, 19, 21, and 23, with states 11, 21, and 23 being end core states. Accordingly, the states 502 of the compressed goto graph correspond to these core states. Note that the states 502 of the compressed goto graph are labeled using the same state numbers as the corresponding core states for consistency. Furthermore, each of the transitions 504 between the states 502 of the compressed goto graph is based on multiple characters. Each transition 504 of the compressed goto graph is generated by combining the consecutive transitions of the original goto graph between adjacent core states.

Once the goto transitions of the compressed DFA are generated, the next transitions of the compressed DFA can be generated. In an AC DFA, most of the next transitions are to states of depth m or less, where m is a small threshold number. In order to save memory, it is possible to ignore transitions to states of depth m or less, and account for these transitions directly in the hardware at the expense of increased length for state identifiers (this is described in greater detail below).

Since the compressed DFA has only states corresponding to the core states of the original DFA, the non-core next transitions of the original DFA must be mapped to the compressed DFA. This can be done by generating next transitions between the cParent of the source node and the sidekicks or cParent of the destination node and modifying the input string for the transitions accordingly. Let $next_o(s_o,a)$ be $d_o^i$. Let $d_o^1$ and $d_o^k$ be adjacent core states such that $d_o^i$ is in the path between $d_o^1$ and $d_o^k$. Note that there can be multiple such $d_o^k$. Let $d_o^1, d_o^2, \ldots, d_{oi}, \ldots, d_o^k$ be the path between $d_o^1$ and $d_o^k$ in the goto graph. If there is no next transition to a state of depth more than m from any of $d_o^1, \ldots, d_o^{k-1}$, then a next transition can be generated from $cParent(s_o)$ to $sidekick(d_o^i)$. Such a $d_o^i$ is called a safe state. If the next transition is to a state that is not safe, then such a transition can not guarantee correctness. A Boolean function safe can be used to indicate whether a state is safe.

FIG. 6 is pseudo code for an algorithm for safe state computation. In the pseudo code identified by 610, the algorithm sets a safe value of a state of the original DFA to true if there are no next transitions to a state of depth greater than m. In the pseudo code identified by 620, the safe value of the state is changed to false if any of the children of that state have a next transition to a state of depth greater than m. In the pseudo code identified by 630, the safe value of a core state is set to true. Thus, the algorithm determines a state to be safe if the state is a core state or the state does not have a next transition to a depth greater than m, and all of its children are safe. This algorithm computes the value of the safe function for each of the states of the original DFA.

In order to generate the next transitions of the compressed DFA, every next transition of the original DFA is mapped to one or more next transitions of the compressed DFA. For every next transition of the original DFA $next_o(s_o,a)=d_o$, a next transition of the compressed DFA $next_c$ is generated from $cParent(s_o)$ either to $cParent(d_o)$ (referred to as a backward next transition) or to all the states in the $sidekick(d_o)$ (referred to as a forward next transition), based on the length of the transition and whether the state $d_o$ is safe. Note that the forward transition will process more input characters and hence has a better throughput than the backward transition, but it is not always possible to generate a forward transition if $d_o$ is not a safe state or the input length of the forward transition is greater than a threshold. According to an embodiment of the present invention, the threshold can be the value K, but the present invention is not limited thereto (the threshold and K can correspond to a width of a Ternary Content-Addressable Memory which will be described in greater detail below).

Figure 8A:
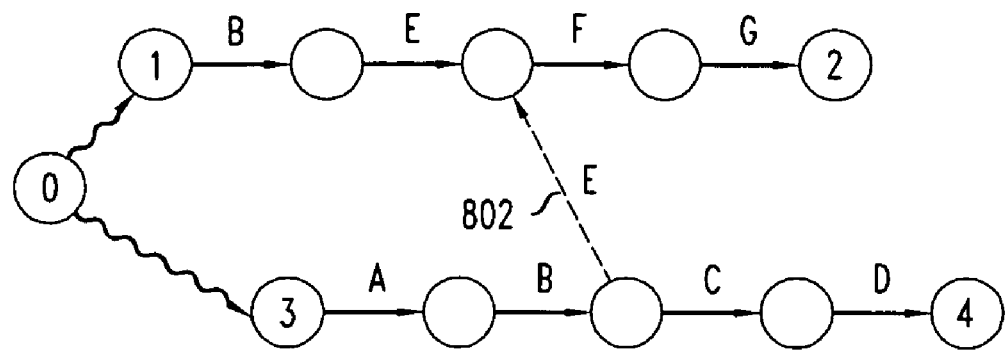
FIG. 8A illustrates an exemplary original DFA.
Figure 8B:
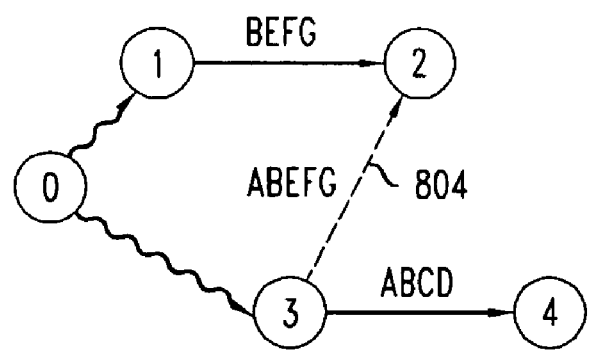
FIG. 8B illustrates an exemplary compressed DFA corresponding to the original DFA of FIG. 8A and including a forward next transition.

FIG. 7 is pseudo code for an algorithm for computing next transitions of the compressed DFA. In the pseudo code identified by 710, a next transition for the compressed DFA is created corresponding to a next transition of the original DFA. More particularly, the pseudo code identified by 710 determines whether to create a forward or backward next transition, and accordingly invokes the pseudo code identified by 720 or 730 to execute the forward or backward transition, respectively. In the pseudo code identified by 720, a forward next transition for $next_o(s_o, a)=d_o$ is formed when $d_o$ is safe and a length of the transition for $cParent(s_o)$ to all states in the $sidekick(d_o)$ is less than or equal to the threshold. The transition is based on input $string(s_o)-string(cParent(s_o))+a+string(sidekick(d_o))-string(d_o))$ and processes all of the input (i.e., $dist(s_o,cParent(s_o)+dist(sidekick(d_o),d_o)+1$ characters, where $dist(s_2, s_1)$ is the difference between the length of $string(s_2)$ and $string(s_1)$). FIGS. 8A and 8B illustrate an exemplary original DFA and an exemplary compressed DFA having a forward next transition 804. As illustrated in FIG. 8A, in the original DFA, a next transition 802 based on E exists from a state between core states 3 and 4 to a state between core states 1 and 2. As illustrated in FIG. 8B, the forward next transition 804 is generated from state 3 to state 2 of the compressed DFA based on ABEFG (the combination of all of the transitions between state 3 and state 2 of the original DFA).

Figure 8C:
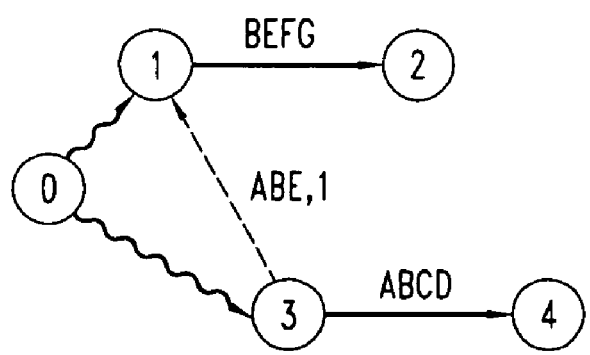
FIG. 8C illustrates an exemplary compressed DFA corresponding to the original DFA of FIG. 8A and including a backward next transition.

Returning to FIG. 7, in the pseudo code identified by 730, a backward next transition for $next(s_o,a)=d_o$ is formed when $d_o$ is not a safe state or a length of the transition from cparent $(s_o)$ to all the states in $sidekick(d_o)$ is more than the threshold. The backward next transition is based on input $string(s_o)-string(cParent(s_o))+a$ and processes $dist(s_o,cParent(s_o))-dist(d_o,cParent(d_ocParent(d_o))+1$. FIG. 8C illustrates an exemplary compressed DFA having a backward next transition 806 corresponding to the next transition 802 of the original DFA of FIG. 8A. As illustrated in FIG. 8C, the backward next transition 806 is generated from state 3 to state 1 in the compressed DFA based on the characters ABE, 1. This notation means that the compressed DFA transitions from state 3 to state 1 based on ABE, and then for the next pattern matching memory lookup, the input stream starts from one position ahead of its current position, meaning 1 character has been consumed. If no number is indicated, it defaults to the length of the string.

Figure 9:
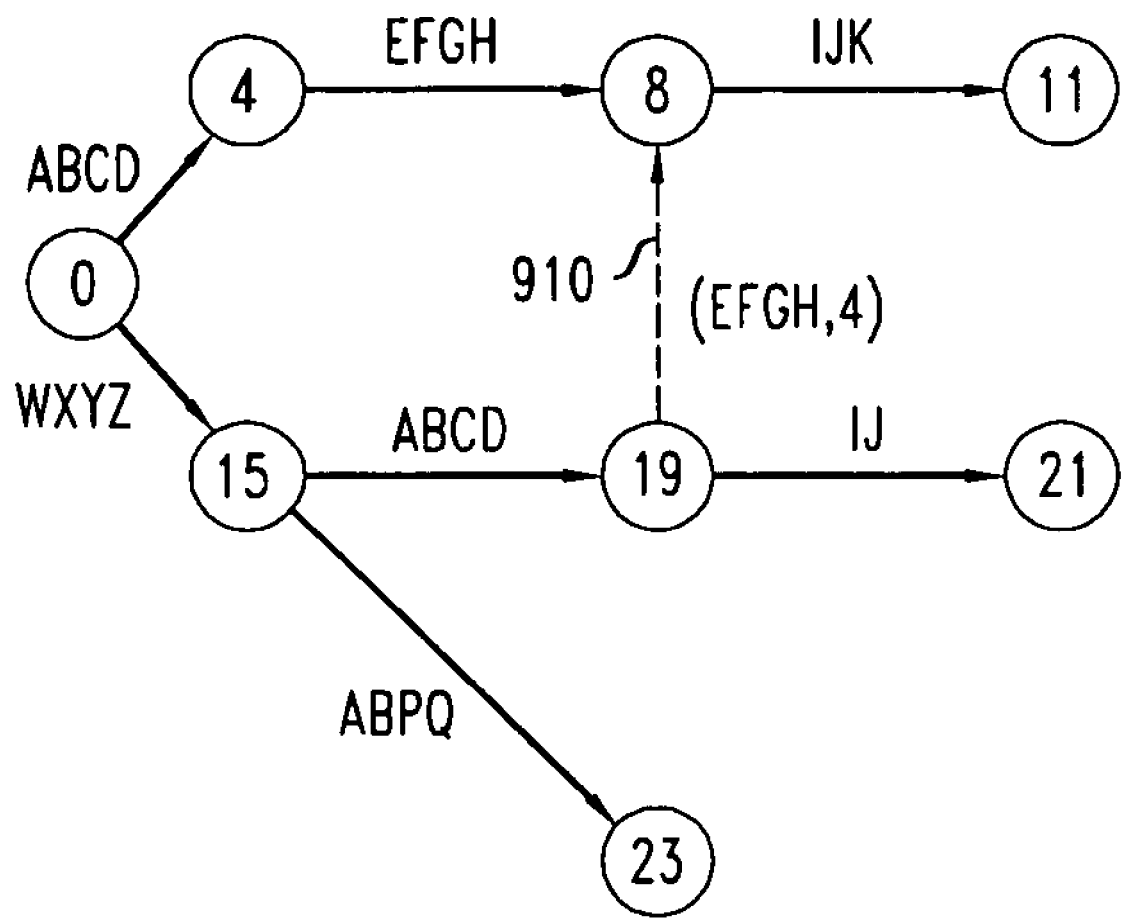
FIG. 9 illustrates an exemplary compressed DFA corresponding to the original DFA of FIG. 3.

FIG. 9 illustrates an exemplary compressed DFA corresponding to the original DFA of FIG. 3. As illustrated in FIG. 9, a next transition 910 from state 19 to state 8 of the compressed DFA is based on EFGH. The effect of this next transition is the same of the next transition 302 from state 19 to state based on E in the original DFA. Furthermore, original next transitions 304 and 305 are to states having depths less than m, and are ignored in the compressed DFA.

A potential problem with the compressed DFA is that a pattern can be missed if the pattern does not start at a position of the input that is multiple of K. For example, if K=4 and the pattern is ABCDEFGHIJKL, there will be a transition from state 0 to state 1 of the compressed DFA on the input ABCD. But, if the input string is XXABCDEFGHIJKL, the compressed DFA will not recognize the pattern since neither XXAB nor CDEF have any transition from state 0. Thus, in order for the compressed DFA to work correctly, the input must be "synchronized" with the compressed DFA. This can be achieved by generating a state in the compressed DFA corresponding to each state in the original DFA whose depth is less than K. Such states in the original DFA are called original shallow states, and such states in the compressed DFA are called compressed shallow states.

FIG. 10 is pseudo code of an algorithm for generating shallow states in the compressed DFA. In the pseudo code identified by 1010, a transition is generated from the root state to each compressed shallow state $s_c$ as follows: Let i be the length of $string(s_c)$; then $goto_c(0, ?^{K-i}+string(s_c))=s_c$, where $?^{K-i}$ represents any K-i characters. In the pseudo code identified by 1020, goto transitions are added from each compressed shallow state $s_c$ to the compressed states $d_c$ corresponding to the nearest core states (i.e., $goto(s_c, string(d_c)-string(s_c))=d_c$).

Figure 11:
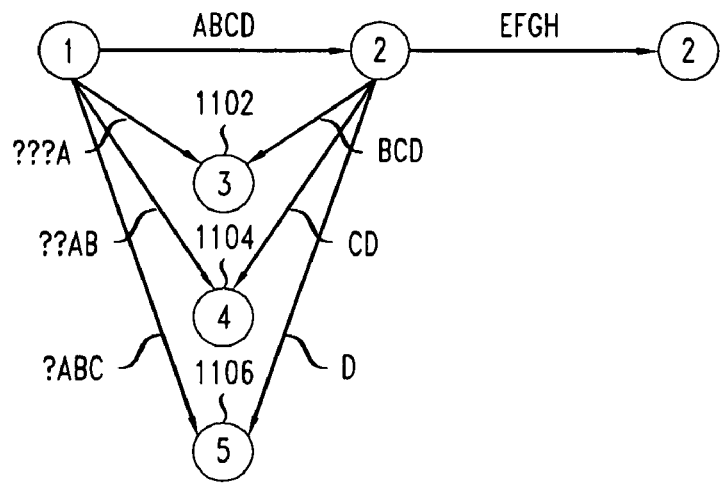
FIG. 11 illustrates an exemplary compressed DFA with shallow states.

FIG. 11 illustrates an example of a compressed DFA with compressed shallow states. As illustrated in FIG. 7, shallow states 3 1102, 4 1104, and 5 1106 are added to the compressed DFA for the pattern ABCDEFGH with K=4. Thus, for any number of characters input before ABCD, the compressed DFA reaches state 1 of the compressed DFA which corresponds to the first core state of an original DFA. In order to reach state 1, the compressed DFA will either take one direct transition or two transitions through an intermediate shallow state 1102, 1104, or 1106. In the case of one direct transition, K characters are processed in one cycle, and in the case of two transitions through a shallow state, at least K+1 characters are processed in two cycles. Along similar lines, to increase throughput, it is possible to generate shallow states for each of the states of depth less than rK (r≧1) in the original DFA. In this case, a throughput of rK+1 characters in r+1 cycles can be achieved, if only goto transitions occur.

Due to the addition of shallow states, there might be multiple transitions on the same input from a state. For example, if the pattern strings are ABCDEFGH and CDEFGHIJ, on input ABCDEFGH, there are matching transitions from the state 0: one for ABCD and the other for ??CD. In this case, transition to a state whose pattern is of longer length (ignoring don't-care symbols ?) takes precedence.

Figure 12:
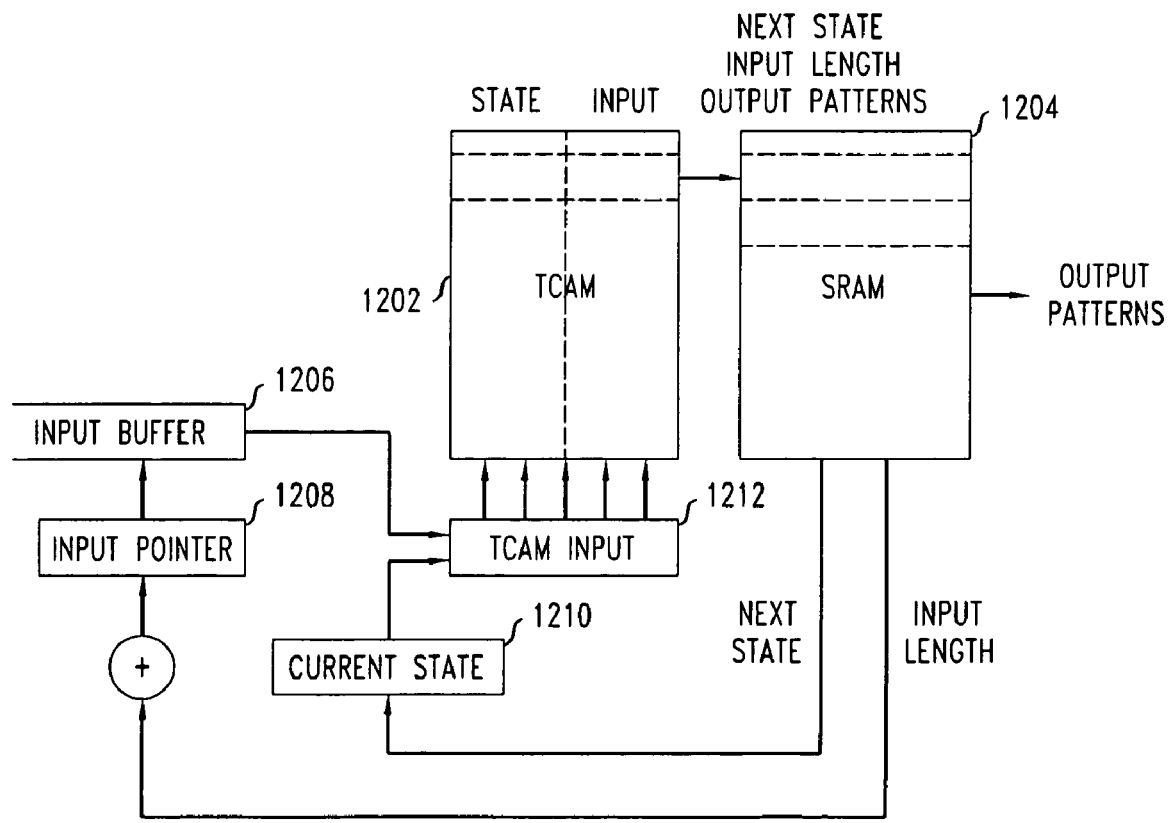
FIG. 12 illustrates a multi-character multi-pattern pattern matching system according to an embodiment of the present invention.

FIG. 12 illustrates a multi-character multi-pattern pattern matching system 1200 according to an embodiment of the present invention. Referring to FIG. 12, the system 1200 includes a Ternary Content-Addressable Memory (TCAM) 1202 and static random access memory (SRAM) 1204. The TCAM 1202 is used to store the state transitions of the compressed DFA. Returning to FIG. 1, at step 140, the compressed DFA is stored in the TCAM 1202 and the SRAM 1204. The transitions (both goto and next) of the compressed DFA are represented as entries in the TCAM 1202. Each TCAM entry consists of a (state, input) pair which represents a corresponding transition of the compressed DFA. The address of each TCAM entry points to a memory location in the SRAM 1204, which contains the next state for the transition, a number of input characters to be processed by the DFA, and a list of output patterns detected upon reaching this transition. The list of output patterns (output function) associated with a transition includes all previous undetected patterns which are detected as a result of that transition. Note that according to an embodiment of the present invention, the output function is associated with the transitions, not with the states as in the conventional AC algorithm. Accordingly, transitions act as triggers in outputting that a pattern is detected. Although the SRAM 1204 is utilized in conjunction with the TCAM 1202 in the embodiment of FIG. 12, the present invention is not limited thereto. Any memory configured to work with a TCAM such that an entry in the TCAM points to a location in the memory storing the next state, the number of input characters, and the list output patterns can be used as well.

As described above, the compressed DFA can ignore next transitions of the original DFA that are to a state of depth less than or equal to m. These next transitions can be compensated for by encoding the corresponding states in a certain manner in the TCAM 1202. In the original DFA, a state $s_o$ has a next transition to a state $d_o$ of depth 1 on the input a only if the root has a goto transition to $d_o$ on the input a. Furthermore, every state $s_o$ in the DFA that does not have a goto transition on the input a will have a next transition to $d_o$ on the input a. Hence, if the root node is represented in the TCAM 1202 such that every state will match the representation, the next transitions to a depth of 1 can be ignored. A "don't care" value (represented by ?) is used to indicate that any input character will be considered a match for the don't care value. A state id of all "don't care" values ("?? . . . ?") will match every state. Similarly, a state so has a next transition on an input a to a state $d_o$ of depth 2 only if string($d_o$)=ba, where $d_o$=goto ($d_o'$, a) and $d_o'$=goto (root, b). Thus, $d_o'$ is the parent of $d_o$. Let $i_1, \ldots, i_8$ be the binary representation of the input a. Thus, if the state id of $d_o$ is don't care followed by $i_1, \ldots, i_8$ (i.e., "????? $i_1, \ldots, i_8$") and the last 8 bits of the state id of $s_o$ is $i_1, \ldots, i_8$, then all of the next transitions to a state of depth 2 can be ignored. Along similar lines, if the trailing 8(m-1) bits of the state id of state $s_o$ is dedicated to encode the last m-1 bytes of string($s_o$) and the state id of the corresponding destination state $d_o$ (of depth<=m) is also represented as don't care followed by the string($d_o$), the next transitions to any of the states having a depth less than or equal to m can be ignored. This allows the amount of memory necessary to perform this algorithm to be optimized.

Because the TCAM 1202 uses a first match heuristic instead of a best match heuristic, the order on the entries in the TCAM 1202 is important to ensure correct implementation of the algorithm. All TCAM entries are sorted based on the state ids, with the transitions to states with state identifiers having fewer don't cares ('?') occurring higher up in the TCAM 1202. In the TCAM 1202, a transition that is higher than another transition has precedence over the other transition. Within entries having the same state identifiers, a goto transition to a state precedes any next transitions to the state. Furthermore, for the goto and next transitions, transitions to a state that is part of a larger pattern precede transitions to a state that is part of a smaller pattern, and transitions to a state based on a lower number of don't cares ('?') precede transitions to a state based on a higher number of don't cares ('?'). This ensures that the longest possible transition (i.e., maximum number of characters processed) is given a higher priority than transitions that consume fewer characters.

Returning to FIG. 1, at step 150, an input stream is run on the compressed DFA in order to detect all occurrences of the patterns in the compressed DFA. The input stream is received and stored at an input buffer 1206 of the system 1200. The system 1200 includes two registers, an input pointer 1208 and a current state register 1210. Then input pointer 1208 points to the start of a portion of the input stream in the input buffer 1206 that is to be fed next to the DFA in the TCAM 1202. The current state register 1210 stores the current state of the DFA. When the input stream is received, the input pointer 1208 and the current state register 1210 are initialized to the start of the input buffer 1206 and the state zero, respectively.

In order to run the input stream on the compressed DFA, a certain number of bytes (characters) of the input stream and the current state of the compressed DFA are input to the TCAM 1202 from the input buffer 1206 and the current state register 1210, respectively as TCAM input 1212. The number of bytes of the input stream to be input to the TCAM 1202 can correspond to K and/or a width TW of the TCAM. It is also possible that K is determined based on TW when generating the compressed DFA. The TCAM input 1212 is compared to the TCAM entries, and if there is a matching entry, the index of the (first) matching entry gives a location in the SRAM 1204. That location contains the next state, the offset (input length) to advance the input pointer 1208, and a list of matched patterns (if any). The input pointer 1208 is advanced by the offset (input length), and the next state is stored in the current state register 1210. The patterns in the pattern list are output. For example, the patterns can be output to a table that keeps track of all of the patterns matched. If there is no matching entry in the TCAM 1202 for the TCAM input 1212, the current state register 1210 is set to the start state, and the input pointer 1208 is advanced by K. This process then repeats until the entire input stream is run on the compressed DFA. Thus, the compressed DFA transitions between states thereof based on multiple characters of the input stream in order to detect each occurrence of all of the patterns of the compressed DFA. The use of the TCAM 1202 to perform this algorithm gives a constant time search, as opposed to a linear time search that would result from using only an SRAM.

According to an embodiment of the present invention, when the input stream is a stream of data packets, it is possible to run the pattern matching algorithm on multiple flows simultaneously, where multiple flows converge and get reordered as packets or smaller data units. In this case, each flow can be uniquely identified by the 5-tuple (source ip, source port, dst ip, dst port, protocol). The current state information for each flow is stored in a flow tracking register. For the first packet in any stream or flow, the current state stored in the current state register 1210 is reset to zero, and the algorithm starts from there. At the end of each packet, the flow tracking register is updated with the current state of the flow. Then for any subsequent packets in that flow, the current state is retrieved from the flow tracking register and the current state register 1210 is updated accordingly. This is useful to track virus/worm signatures across an input stream (flow) split across multiple packets.

At step 160, regular expressions based on the detected patterns are identified. As described above, regular expressions are expressed as multiple sub patterns in the pattern database, and thus the compressed DFA. In order to identify regular expressions, it is possible to keep track of these multiple sub patterns and detect when these sub patterns occur at specific offsets as in the regular expression. The output patterns from the SRAM 1204 corresponding to any transition occurring in the DFA and detected in the TCAM 1202 can be represented in the form of pattern identifiers. These pattern identifiers are composed of a pattern id which is unique to all simple patterns belonging to one regular expression, a byte offset of the current pattern in the regular expression from the previous pattern, and the number of patterns yet to be looked at to flag that regular expression. These pattern identifiers can be stored in a lookup table, separate from the other patterns, that keeps track of all the current regular expressions matched. When all sub-patterns of a regular expression are detected at the appropriate offsets, the lookup table identifies that regular expression based on the sub patterns detected in the input stream. Thus, the multi-character multi-pattern pattern matching algorithm can be used to detected regular expressions, including those with fixed or variable length wildcards.

Figure 13:
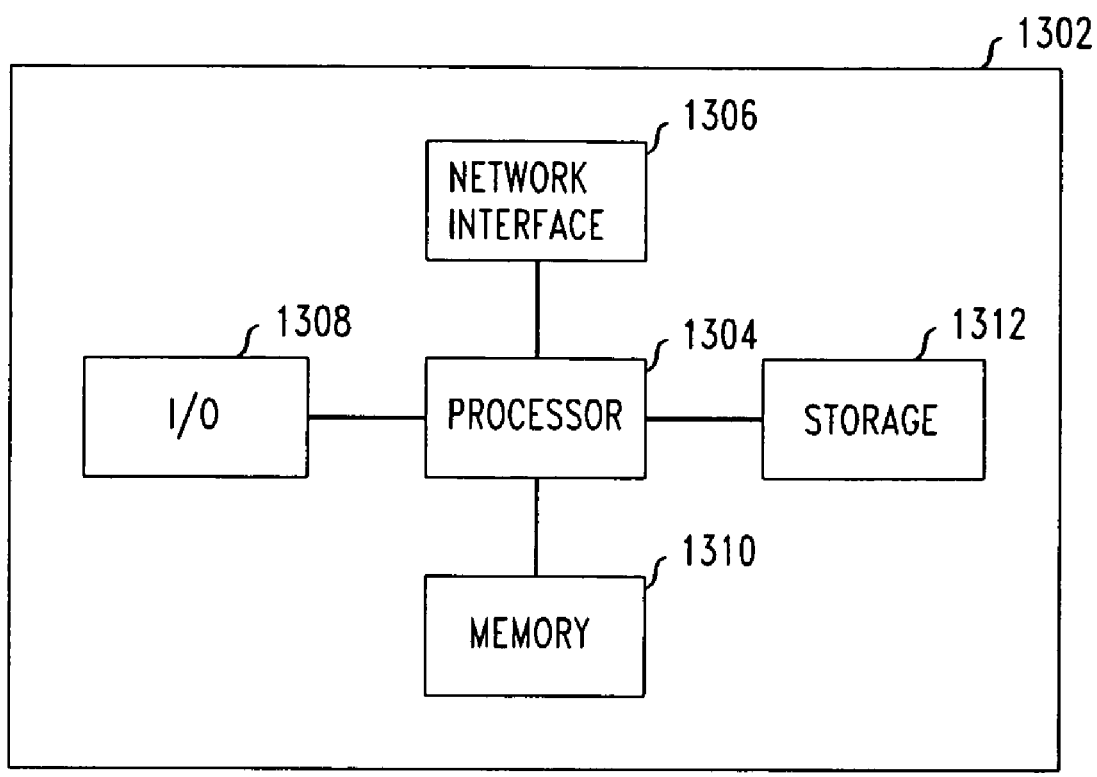
FIG. 13 is a high level block diagram of a computer.

According to another embodiment of the present invention, the above described steps of the multi-character multi-pattern pattern matching algorithm may be implemented on an appropriately configured computer, for example, using well known computer processors, memory units, storage devices, computer software, and other components. A high level block diagram of such a computer is shown in FIG. 13. Computer 1302 contains a processor 1304 which controls the overall operation of computer 1302 by executing computer program instructions which define such operation. The computer program instructions may be stored in a storage device 1312 (e.g., magnetic disk) and loaded into memory 1310 when execution of the computer program instructions is desired. Thus, the operation of the computer will be defined by computer program instructions stored in memory 1310 and/or storage 1312 and the operation of the computer will be controlled by processor 1304 executing the computer program instructions. Computer 1302 also includes one or more network interfaces 1306 for communicating with other devices via a network. Computer 1302 also includes input/output 1308 which represents devices which allow for user interaction with the computer 1302 (e.g., display, keyboard, mouse, speakers, buttons, etc.). One skilled in the art will recognize that an implementation of an actual computer will contain other components as well, and that FIG. 13 is a high level representation of some of the components of such a computer for illustrative purposes. One skilled in the art will also recognize that dedicated hardware could be substituted for software, and that the functions described herein could be implemented using various combinations of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of detecting each occurrence of a plurality of patterns in an input stream, comprising:
    receiving, by a computer, an input stream;
    generating a compressed deterministic finite state automaton (DFA) based on the plurality of patterns; and
    transitioning between states of said compressed DFA, at least some transitions based on multiple characters of the input stream, such that said generating step includes,
        constructing an original DFA based on the plurality of patterns, and
        compressing the original DFA such that each state of the compressed DFA represents multiple consecutive states of the original DFA, and each transition between consecutive states of the compressed DFA is a combination of all transitions between the multiple consecutive states of the original DFA, such that said compressing step includes,
            determining core states of the original DFA to be states having a depth of a multiple of K and pattern ending states,
            generating a state of the compressed DFA corresponding to each core node of the original DFA,
            generating goto transitions between each of the states of the compressed DFA by combining multiple transitions between the core states in the original DFA,
            generating next transitions between states of the compressed DFA based on next transitions between states of the original DFA, and
            generating shallow states of the compressed DFA and corresponding transitions based on shallow states of the original DFA.

2. The method of claim 1, wherein said transitioning step comprises:
    comparing a number of characters of the input stream to one or more transitions of the compressed DFA to find a matching transition;
    updating a current state of the DFA to a state associated with said matching transition;
    outputting any detected patterns associated with said matching transition; and
    repeating said comparing, updating, and outputting steps over a length of the input stream.

3. The method of claim 2, wherein the plurality of patterns comprise sub patterns of at least one regular expression, the method further comprising:
    identifying the at least one regular expression based on the sub patterns being output as detected patterns and being separated from each other by specific offsets corresponding to the at least one regular expression.

4. The method of claim 1, wherein said step of generating next transitions comprises:
   determining whether a next transition of the original DFA is to a safe state of the original DFA;
   if the next transition of the original DFA is to a safe state of the original DFA, generating a forward next transition between states in the compressed DFA based on the next transition of the original DFA; and
   if the next transition of the original DFA is to an unsafe state of the original DFA, generating a backward next transition between states in the compressed DFA based on the next transition of the original DFA.

5. The method of claim 4, wherein said step of determining whether a next transition of the original DFA is to a safe state of the original DFA comprises:
   if a state of the original DFA is core state, determining the state of the original DFA to be safe;
   if a state of the original DFA and its children states between said state and a next core state have no next transitions to any state having a depth greater than a specified value, determining the state of the original DFA to be safe; and
   if a state of the original DFA or any of its children states have any next transitions to any state having a depth greater than the specified value and the state of the original DFA is not a core state, determining that the state of the original DFA is unsafe.

6. The method of claim 1, wherein said step of generating next transitions comprises:
   generating next transitions between states of the compressed DFA based only on next transitions to states of the original DFA having a depth greater than a specified value.

7. The method of claim 1, wherein said step of generating shallow states comprises:
   generating a shallow state in the compressed DFA corresponding to each state of the original DFA having a depth less than K;
   generating goto transitions between a root state of the compressed DFA and each shallow state of the compressed DFA using "don't care" values; and
   generating goto transitions between each shallow state of the compressed DFA and a state of the compressed DFA corresponding to one of the respective core states of the original DFA.

8. An apparatus comprising:
   a Ternary Content Addressable Memory (TCAM) storing entries associated with a compressed deterministic finite state automaton (DFA), each entry including a state identifier of a state of the compressed DFA and a multiple character transition string defining a transition from that state of the compressed DFA, each transition between consecutive states of the compressed DFA is a combination of all transitions between multiple consecutive states of the original DFA;
   a memory storing a next state identifier, an input length value, and a detected patterns list corresponding to each entry of the TCAM, such that said memory comprises a Static Random Access Memory (SRAM);
   an input buffer storing an input stream and configured to provide the input stream to the TCAM multiple characters at a time;
   a first register storing an input pointer which indicates a portion of the input stream to be provided to the TCAM; and
   a second register storing a current state of the compressed DFA and configured to provide the current state of the compressed DFA to the TCAM.

9. The apparatus of claim 8, wherein the TCAM is configured to compare multiple characters of the input stream and the current state of the compressed DFA to the entries stored therein, and when an entry matches the input characters and current state, the TCAM returns an address of a memory location in the SRAM of the corresponding next state identifier, input value length, and detected patterns list.

10. The apparatus of claim 9, wherein the second register is configured to save the corresponding next state identifier as the current state, and the first register is configured to control how many characters of the input stream are input to the TCAM based on the corresponding input value length.

11. The apparatus of claim 10, wherein the entries of the TCAM are ordered based on precedence and the TCAM returns the address of the memory location in the SRAM corresponding to the first matching entry to the input characters and current state.

12. The apparatus of claim 8, wherein said input stream comprises a stream of data packets from multiple flows, the system further comprising:
   a third register storing the current state of each flow and configured to update the second register based on the flow identified for each data packet.

13. A method of detecting each occurrence of a plurality of patterns in an input stream, comprising:
   receiving, by a computer, an input stream including a plurality of patterns;
   constructing an original deterministic finite state automaton (DFA) based on the plurality of patterns;
   generating a compressed DFA by compressing the original DFA, each state of the compressed DFA representing multiple consecutive states of the original DFA, each transition between consecutive states of the compressed DFA is a combination of all transitions between multiple consecutive states of the original DFA; and
   transitioning between states of said compressed DFA, at least some transitions based on multiple characters of the input stream.

14. An apparatus comprising:
   an interface for receiving an input stream including a plurality of patterns, an original deterministic finite state automaton (DFA) based on the plurality of patterns being constructed;
   a processor configured to generate a compressed DFA by compressing the original DFA, each state of the compressed DFA representing multiple consecutive states of the original DFA, such that each transition between the multiple consecutive states of the compressed DFA is a combination of transitions between the multiple consecutive states of the original DFA; and
   a first memory for storing entries associated with the compressed DFA, each entry including a state identifier of a state of the compressed DFA and a multiple character transition string defining a transition from the identified state of the compressed DFA.

15. The apparatus of claim 14, wherein the first memory is a Ternary Content-Addressable Memory (TCAM).

16. The apparatus of claim 14, further comprising:
   a second memory configured to be used in conjunction to the first memory by storing at least a next state identifier, such that the first memory generates an address pointing to a memory location in the second memory corresponding to at least the next state identifier.

17. The apparatus of claim 16, wherein the second memory is configured to output a list including detected patterns as a result of a transition between states of the compressed DFA, the detected pattern being previously undetected patterns.

18. The apparatus of claim 16, wherein the second memory is a Static Random Access Memory (SRAM).

19. The apparatus of claim 16, wherein the first memory is configured to compare the entries to multiple characters of the input stream and a current state of the compressed DFA, such that if an entry matches the input characters and the current state, the first memory generates the address.

20. The apparatus of claim 14, further comprising:
a register storing a current state of the compressed DFA and configured to provide the current state of the compressed DFA to the first memory in response to an input of the next state identifier.

* * * * *